United States Patent
McCulley

(10) Patent No.: US 8,471,421 B2
(45) Date of Patent: Jun. 25, 2013

(54) MAGNETIC MOTOR GENERATOR HAVING A ROLLING CONFIGURATION

(76) Inventor: Michael Marion McCulley, Benicia, CA (US)

(*) Notice: Subject to any disclaimer, the term of this patent is extended or adjusted under 35 U.S.C. 154(b) by 167 days.

(21) Appl. No.: 13/232,554

(22) Filed: Sep. 14, 2011

(65) Prior Publication Data

US 2013/0062979 A1 Mar. 14, 2013

(51) Int. Cl.
*H02K 7/02* (2006.01)

(52) U.S. Cl.
USPC .............................. 310/74; 310/90.5

(58) Field of Classification Search
USPC .................... 310/74, 90.5, 113, 153
See application file for complete search history.

(56) References Cited

U.S. PATENT DOCUMENTS

| | | | | |
|---|---|---|---|---|
| 5,495,221 A * | 2/1996 | Post | ............................ | 335/299 |
| 5,905,321 A * | 5/1999 | Clifton et al. | ................. | 310/178 |
| 6,707,187 B1 * | 3/2004 | Gabrys | .......................... | 310/74 |
| 8,053,940 B2 * | 11/2011 | McCulley | ....................... | 310/74 |
| 2004/0245877 A1 * | 12/2004 | Khalizadeh | ................... | 310/113 |
| 2007/0252463 A1 * | 11/2007 | Chang | .......................... | 310/153 |

* cited by examiner

*Primary Examiner* — Nguyen N Hanh

(57) ABSTRACT

A magnetic motor generator wherein electric power is produced by rotating a one-piece magnetic floating flywheel assembly that rotates in a rolling motion. The flywheel assembly is operated by linear induction motors and is repelled upward by a stationary natural magnet. The floating flywheel assembly magnetic axle rotates inside double magnetic collar bearings, which have repelling stationary magnets to center the axle at speed while moving along a support frame. The floating flywheel assembly will have no physical contact with other components in order to prevent bearing losses at speed. The moving components are also enclosed in a vacuum chamber in order to prevent wind resistance, or windage losses at speed. The floating flywheel assembly rotors rotate inside generator stators in order to generate electric power.

5 Claims, 3 Drawing Sheets

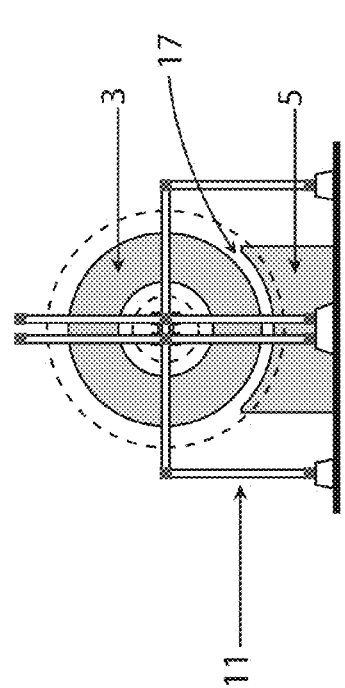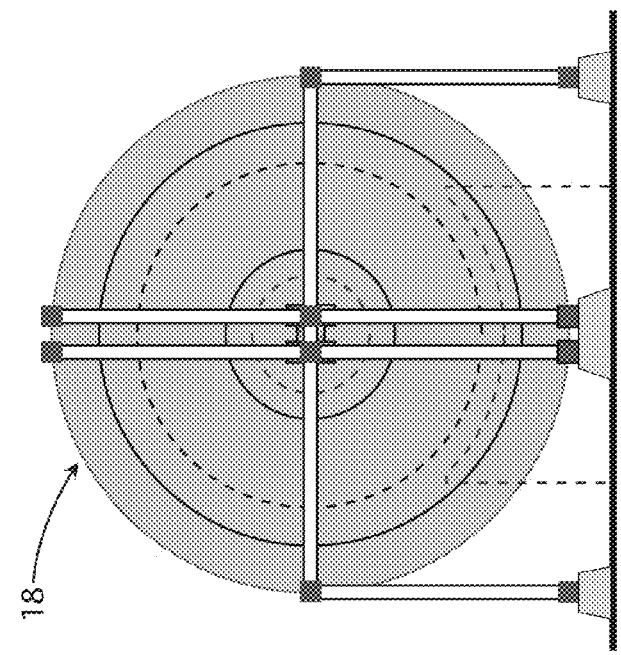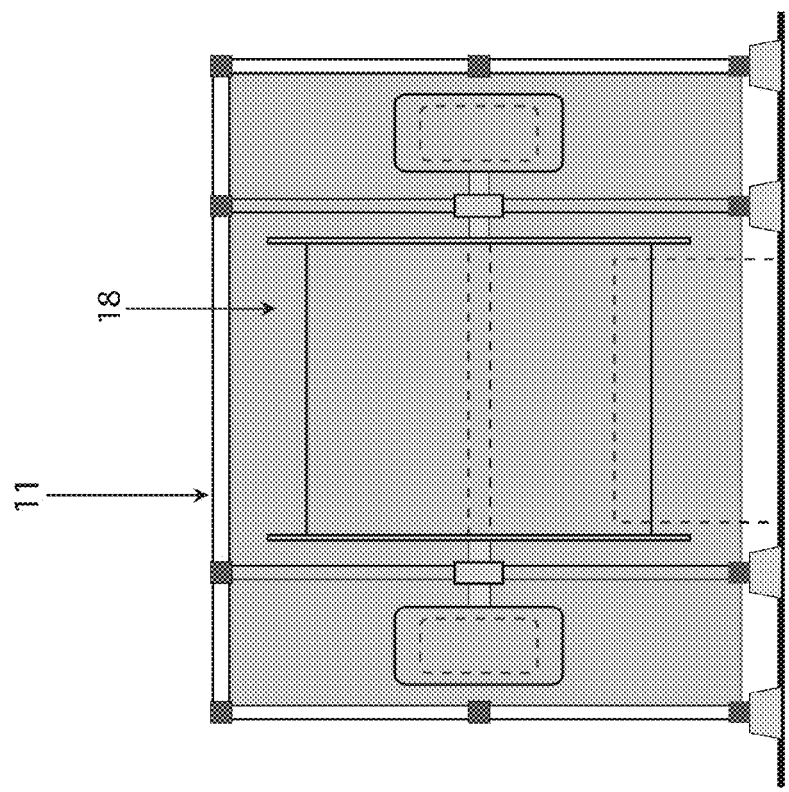
Fig. 3

MAGNETIC MOTOR GENERATOR HAVING A ROLLING CONFIGURATION

FIELD OF THE INVENTION

The present invention relates generally to electric power generation, and specifically to motor generators that make use of stored rotational energy.

BACKGROUND OF THE INVENTION

Some conventional designs exist for producing electricity by spinning the rotor assemblies of AC/DC generators that make use of natural forces, such as generators that use flowing water, as in hydroelectric systems, or by the use of wind-power, such as in wind turbine systems. There are also thermal systems drawing heat from the ground, which turns steam-powered turbines, which in turn rotate a generator to produce electricity. Solar powered electricity produced by systems that use photovoltaic solar panels are also commonly known.

SUMMARY OF THE INVENTION

The present invention incorporates a magnetic motor generator having a rolling configuration based floating flywheel that can overcome some of the disadvantages of other conventional electric power generating systems, and some that make use of natural forces. The present invention will supply temporary electric power, or extend and enhance the power supply of conventional systems. One advantage of the present invention is that it will not rely on weather conditions to generate electric power. Another advantage of the present invention is that it will also be capable of providing portable electric power. The present invention can easily be installed where needed to deliver standby electric power at the source, or it can utilize several units connected together by electric power lines to transmit power over land distances. Optionally, the present invention can be installed in an ocean going vehicle-based application to deliver emergency or transient peaking power for ocean going systems. Optionally, the present invention can be installed in ground transportation systems to deliver standby power to hybrid power systems, or in ground facilities where space is limited or where weather is unpredictable.

The present invention uses a combination of natural magnetic force and powered magnetic force to roll a floating flywheel assembly, which in turn rotates the rotors of electric power generators in order to generate energy for use outside the system. The present invention is the first of its kind to use this specific rolling configuration combination of components that comprise this new magnetic system. The floating flywheel assembly in the present invention will maximize the operating efficiency, mechanical advantage and viability of the system. The floating flywheel assembly is comprised of several parts held together as one moving piece. The floating flywheel assembly is comprised of a magnetic cylinder connected to two metal disks that are rotated by a linear induction motors. The flywheel has an axle that is held in place and centered by double magnetic collar bearings, such as active magnetic bearings, to reduce bearing losses at speed. The axle is connected to the flywheel and rotor sections of electric power generators, and the whole floating flywheel assembly itself is held away from the ground and other components by an additional larger stationary natural magnet. The floating flywheel portion of the present invention will sit above a gap of space between itself and the stationary natural magnet in order to eliminate friction between itself and all other components. The stationary natural magnet does not draw any electrical power, and more than one may be required.

Additionally, the present invention uses linear induction motors to rotate the floating flywheel assembly by powered magnetic force, and the linear induction motors will have a gap of space between themselves and the floating flywheel. A timing computer controls the operation of the linear induction motors. The purpose of the timing computer is to assess the speed of the flywheel and then fire the linear induction motors temporarily and only when necessary to maintain flywheel rotation. The purpose of the controlled firing of the linear induction motors is to conserve energy and minimize losses, keeping the linear induction motors offline as much as possible. The flywheel will free-roll at speed, without being constantly driven by the linear induction motors. As the flywheel slows down, the linear induction motors will fire, controlled by the timing computer, only when necessary and with minimal power to keep the flywheel rotating during operation.

Finally, the present invention uses a vacuum chamber that is installed around the rolling floating flywheel assembly and generator components. The vacuum chamber encloses all moving components to prevent wind resistance, or windage losses during operation, such as excessive air passing over the flywheel. The vacuum chamber will also provide for less noise during operation.

The present invention will provide for the expanded operating efficiency of current electric power generation systems as well as for emergency backup power. If used as a flywheel battery, sometimes referred to as a "motor generator set," the rotating axle can have both a DC motor and/or an AC generator installed, and either can be the motor depending on whether the system is charging the battery storage from the AC/DC conduit or supplying an emergency AC power load from the batteries. The primary purpose of the present invention can be thought of as an inertia-based standby system with virtually no losses at speed, waiting to deliver a power load for emergency or transient peaking power. With no windage and no bearing losses at speed, the present invention can be thought of in standby mode, ready to deliver transient power by converting the stored rotational mechanical energy of the rolling floating flywheel assembly back into electric power, and with minimal power to keep the flywheel rotating at speed. If used as a power transmitter, electric power can be provided by one unit, or several units can be connected together to transmit power in steps from electric power stations over land to end users.

BRIEF DESCRIPTION OF THE FIGURES

FIG. 1*a* represents a side view and separate components.

FIG. 1*b* represents a front view and the direction of rotation.

FIG. 2*a* represents a side view and placement of the double magnetic collar bearings.

FIG. 2*b* represents a top view detail.

FIG. 2*c* represents a front view detail.

FIG. 3 represents an overview of the vacuum chamber component.

FIG. 3*a* represents a side view of the vacuum chamber component.

FIG. 3b represents a front view and the gap of space between the flywheel and natural magnet.

FIG. 3c represents a front view of the vacuum chamber component.

DETAILED DESCRIPTION OF THE FIGURES

Figure 1:
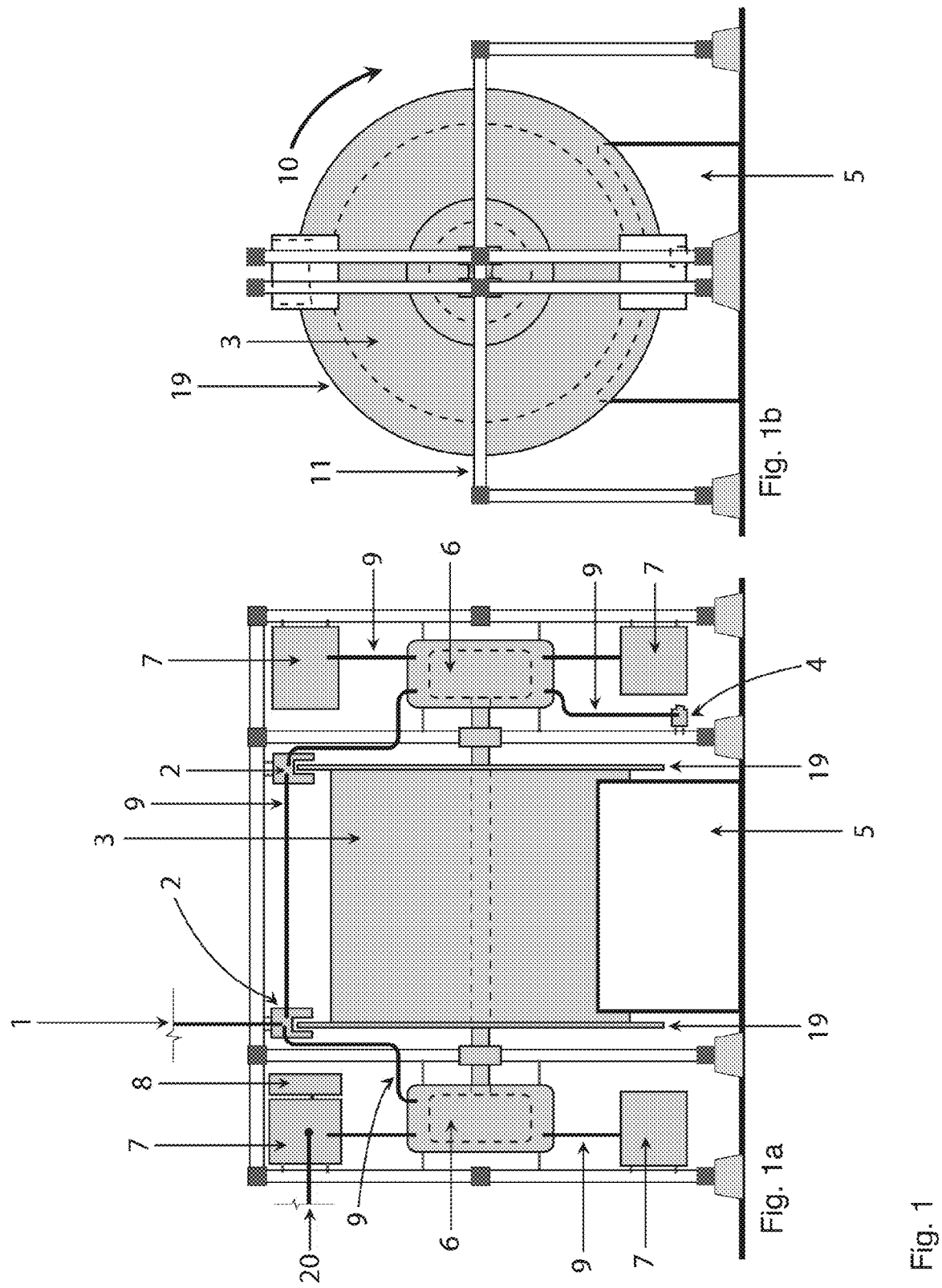
FIG. 1 represents an overview of the magnetic motor generator having a rolling configuration.

FIG. 1 represents an overview of the magnetic motor generator having a rolling configuration.

FIG. 1a represents a side view and separate components. Electric power is sent into the magnetic motor generator from an outside source via the electrical conduit 1 to drive the system. Electric power flows to the linear induction motors 2 via the electrical conduit 1 from an outside source. The linear induction motors 2 set a floating flywheel assembly into rolling rotation, and will maintain the rotation throughout operation. The linear induction motors 2 rotate the floating flywheel assembly with powered magnetic force and without physical contact with the flywheel metal disks 19. The metal disks 19 rotate with the floating flywheel assembly. The floating flywheel assembly is comprised of a magnetic cylinder 3, two metal disks 19 and an axle 13, herein, FIG. 2. Additionally, the floating flywheel assembly is comprised of rotor components that rotate inside stator components of generators 6 to generate electric power, such as in AC/DC power applications. The timing computer 4 controls the operation of the linear induction motors 2. The timing computer 4 assesses the speed of the flywheel and subsequently fires the linear induction motors 2 temporarily and only when necessary to maintain the flywheel rotation. The natural magnet component 5 has a charge that is always present, and is applied to the floating flywheel assembly cylinder 3 to repel it away from the natural magnet 5. Electric power is generated in the generators 6 during operation. Space will be built within the generator components 6 to account for slight up and down movement of the floating flywheel assembly herein, and to allow for no physical contact between the rotors and stators in the generators 6. Electric power is distributed from the generators 6 to battery storage components 7 via power conduits 9. The batteries 7 will store surplus electrical power from the generators 6. Electric power is also distributed from the generators 6 to the timing computer 4 and to assist the linear induction motors 2 via the power conduits 9. Electric power is also distributed from the battery storage components 7 via the power conduits 9 to assist the linear induction motors 2. An AC/DC inverter set 8 can convert electric power for use in AC or DC power applications as needed. Surplus electric power is distributed from the battery storage 7 or directly from the generators 6 to a system, receiver or to supply a load outside of the present invention via the electrical conduit 20.

FIG. 1b represents a front view and the direction of rotation. A support frame 11 will support all of the components that are attached to it. The direction of rolling flywheel rotation 10 is shown in the front view. The rotating floating flywheel assembly cylinder 3 rides on the magnetic force provided by the natural magnet 5, which prevents the resistance caused by natural gravity on the rotating flywheel assembly. More than one natural magnet 5 may be required. The natural magnet component 5 does not draw any electrical power.

Figure 2:
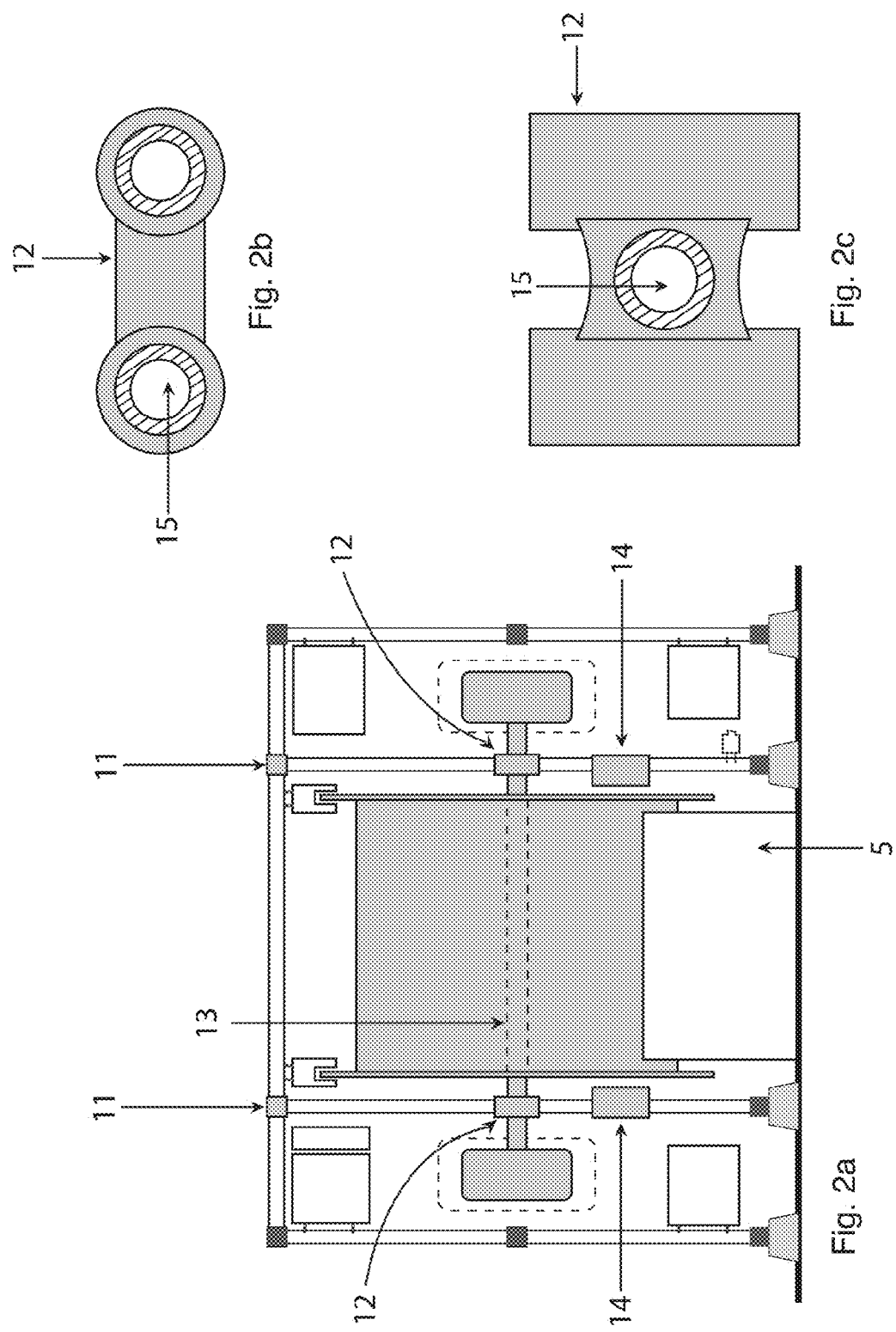
FIG. 2 represents an overview of the two double magnetic collar bearings.

FIG. 2 represents an overview of the two double magnetic collar bearings.

FIG. 2a represents a side view and placement of the double magnetic collar bearings. The floating flywheel assembly axle 13 rotates inside two double magnetic collar bearings 12 installed onto the frame struts 11. The double magnetic collar bearings 12 allow for the rotating motion of the floating flywheel axle 13 without bearing losses, as well as slight up and down floating movements for the axle 13. The floating flywheel assembly is held off of the ground and in place by the stationary natural magnet 5, which is placed underneath the flywheel assembly. The two double magnetic collar bearings 12 are placed along the rotating floating flywheel axle 13. The axle 13 is not solid steel, but a metal shaft surrounded by donut-like magnets that have a magnetic charge, and the collar bearings 12 have repelling stationary magnets to center the axle 13 at speed, such as in active magnetic bearings. Natural bumper magnets 14 do not draw any electrical power and will be placed onto the frame struts 11 as needed in order to center the floating flywheel assembly along the axle 13 and repel it away from the frame struts 11.

FIG. 2b represents a top view detail. The support frame struts 11 pass through the center 15 of the double magnetic collar bearings 12 in order to maintain the placement of the axle 13 during operation. There is no physical contact between the support frame struts 11 and the double magnetic collar bearings 12.

FIG. 2c represents a front view detail. The axle 13 passes through the center 15 of the double magnetic collar bearings 12 in order to maintain the placement of the axle 13 during operation. There is no physical contact between floating flywheel assembly axle 13 and the double magnetic collar bearings 12.

FIG. 3 represents an overview of the vacuum chamber component.

FIG. 3a represents a side view of the vacuum chamber component 18. The vacuum chamber component 18 is installed onto a support frame 11. The vacuum chamber 18 encloses, but is not limited to the floating flywheel assembly herein, FIG. 1 and the generator components 6 herein, FIG. 1.

FIG. 3b represents a front view and clearance of the floating flywheel cylinder 3 from other components. The gap 17 represents the space between the stationary natural magnet 5 and the rotating floating flywheel assembly cylinder 3.

FIG. 3c represents a front view of the vacuum chamber component. The vacuum chamber 18 will prevent wind resistance, or windage losses during operation on all moving components.

What is claimed is:

1. A magnetic motor generator having a rolling configuration, comprising of a floating flywheel assembly that is built as one moving piece, wherein the floating flywheel assembly is comprised of a magnetic cylinder connected to two metal disks that are rotated in a rolling motion by linear induction motor components, wherein the magnetic cylinder is not solid steel, but is comprised of magnets that have a magnetic charge that repels the magnetic cylinder away from a stationary natural magnet component, wherein the stationary natural magnet is installed underneath the magnetic cylinder and which subsequently repels the entire floating flywheel assembly, wherein the floating flywheel assembly is additionally comprised of an axle that rotates inside two double magnetic collar bearings, wherein the axle is not solid steel, but a metal shaft surrounded by a donut-like magnet that has a magnetic charge, wherein the double magnetic collar bearings are comprised of repelling stationary magnets that center the axle at speed, wherein the double magnetic collar bearings also move as needed along frame struts, wherein the floating flywheel assembly is additionally comprised of generator rotor components on the axle which rotate inside generator stator components, wherein bumper magnets repel the floating flywheel assembly away from the frame struts.

2. A magnetic motor generator having a rolling configuration of claim 1, further comprising of a floating flywheel assembly that does not have physical contact with any other components in order to prevent bearing losses during operation, wherein there is a gap of space between a magnetic cylinder of the floating flywheel assembly and a stationary natural magnet installed underneath the flywheel assembly, wherein there is a gap of space between two metal disks of the floating flywheel assembly and two linear induction motors, wherein there is a gap of space between an axle of the floating flywheel assembly and two double magnetic collar bearings, wherein there is a gap of space between four frame struts of the support frame and two double magnetic collar bearings, wherein there is a gap of space between generator rotors of the floating flywheel assembly and generator stators of the generator components.

3. A magnetic motor generator having a rolling configuration of claim 1, further comprising of linear induction motors that start the rolling rotation of a floating flywheel assembly, wherein the linear induction motors will maintain the floating flywheel assembly rotation throughout operation, wherein the linear induction motors set the floating flywheel assembly into rotation by powered magnetic force without having physical contact with the metal disks of the floating flywheel assembly, wherein a timing computer controls the operation of the linear induction motors and assesses the speed of the floating flywheel assembly, wherein the timing computer fires the linear induction motors temporarily and only when necessary to maintain the operating rotation of the floating flywheel assembly.

4. A magnetic motor generator having a rolling configuration of claim 1, further comprising of an electrical power conduit that receives an outside source of electric power that enters the magnetic motor generator assembly and travels to linear induction motors, wherein the linear induction motors set a floating flywheel assembly into rolling rotation, wherein electric power is generated in generator components by the rotation of rotor components of the floating flywheel assembly that rotate inside stators in the generator components, wherein electric power is generated and distributed from the generator components to battery storage components via power conduits, wherein electric power is additionally distributed from the generator components to a timing computer and to assist the linear induction motors via power conduits, wherein electric power is additionally distributed from the battery storage components to assist the linear induction motors via power conduits, wherein an AC/DC inverter component will convert electric power for use in AC or DC power applications as needed, wherein surplus electric power is distributed from the battery storage components or directly distributed from the generator components via electrical power conduits, wherein electricity is generated by converting the stored rotational mechanical energy of the floating flywheel assembly back into electric power to be used by an outside system, receiver or to supply a load.

5. A magnetic motor generator having a rolling configuration of claim 1, further comprising of a floating flywheel assembly that rotates in a rolling motion and is enclosed inside a vacuum chamber component, wherein the vacuum chamber component is installed onto a support frame and encloses all moving components and is not limited to the floating flywheel assembly, wherein the vacuum chamber encloses generator components of the floating flywheel assembly and all moving components in order to prevent wind resistance during rotation, or windage losses during operation.

* * * * *